(12) United States Patent
Sanford

(10) Patent No.: US 12,724,326 B2
(45) Date of Patent: Sep. 1, 2026

(54) VARIABLE FLARE MOUNT

(71) Applicant: Dylan Paul Sanford, Lake Balboa, CA (US)

(72) Inventor: Dylan Paul Sanford, Lake Balboa, CA (US)

( * ) Notice: Subject to any disclaimer, the term of this patent is extended or adjusted under 35 U.S.C. 154(b) by 175 days.

(21) Appl. No.: 18/677,633

(22) Filed: May 29, 2024

(65) Prior Publication Data

US 2025/0028224 A1 Jan. 23, 2025

Related U.S. Application Data

(60) Provisional application No. 63/528,258, filed on Jul. 21, 2023.

(51) Int. Cl.

| | |
|---|---|
| ***G03B 15/05*** | (2021.01) |
| ***G02B 7/14*** | (2021.01) |
| ***H04N 23/56*** | (2023.01) |
| ***H04N 23/74*** | (2023.01) |
| ***H05B 45/10*** | (2020.01) |
| ***H05B 45/20*** | (2020.01) |

(52) U.S. Cl.

CPC ............... *G03B 15/05* (2013.01); *G02B 7/14* (2013.01); *H04N 23/56* (2023.01); *H04N 23/74* (2023.01); *G03B 2215/056* (2013.01); *G03B 2215/0567* (2013.01); *G03B 2215/0575* (2013.01); *H05B 45/10* (2020.01); *H05B 45/20* (2020.01)

(58) Field of Classification Search

CPC ........... G03B 15/05; H04N 23/56; G02B 7/14

See application file for complete search history.

(56) References Cited

U.S. PATENT DOCUMENTS

| | | | | |
|---|---|---|---|---|
| 3,836,923 | A | 9/1974 | Malick | |
| 4,021,831 | A | 5/1977 | Bercher | |
| 4,816,876 | A | 3/1989 | Pryor | |
| 8,000,598 | B1 | 8/2011 | Tsai | |
| 2021/0029788 | A1* | 1/2021 | Hu | H05B 45/10 |
| 2023/0273428 | A1 | 8/2023 | Neil | |
| 2024/0040244 | A1* | 2/2024 | Liao | H04N 23/56 |

FOREIGN PATENT DOCUMENTS

| | | | |
|---|---|---|---|
| FR | 1323777 | A | 4/1963 |
| FR | 1361122 | A | 5/1964 |
| FR | 1423611 | A | 1/1966 |
| FR | 1484384 | A | 6/1967 |
| JP | 1-267072 | A | 10/1989 |
| JP | 2022-114327 | A | 8/2022 |
| TW | M642268 | U | 6/2023 |

OTHER PUBLICATIONS

ColorFlare Adapter, Fotodiox, Apr. 24, 2018, https://fotodioxpro.com/products/ef-sne-fsn-cltl.

* cited by examiner

*Primary Examiner* — Minh Q Phan

(74) *Attorney, Agent, or Firm* — Knobbe, Martens, Olson & Bear, LLP

(57) ABSTRACT

A system may include a lens comprising a front surface and a rear surface, the rear surface facing an image plane of the camera device. A system may include at least one perforation located on a first surface of the lens mount. A system may include a captive collar configured to be secured to the first surface of the lens mount. A system may include at least one light emitting diode disposed on an inner surface of the captive collar, the at least one light emitting diode configured to emit light in a space between the rear surface of the lens mount and an image plane of the camera device.

19 Claims, 6 Drawing Sheets

VARIABLE FLARE MOUNT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This Application claims the benefit of priority to U.S. Provisional Application No. 63/528,258 filed Jul. 21, 2023, the entire contents of which are hereby incorporated by reference.

BACKGROUND

In over 130 years of motion picture history, and nearly 200 years of photographic history, the basic principles have remained mostly the same: a light source illuminates and is reflected off of the objects or subjects to be recorded; some of those light rays reach a lens or lenses arranged to collect and focus an inverted image of the scene at a defined image plane at or within the camera body; a shutter, typically located at the rear of the lens but before the image plane when mechanical, or integrated into the readout of the sensor when electronic, provides a gateway to control the duration that the sensor block or film emulsion is exposed to the projection; the information gathered is either encoded or processed, and the resultant image or series of images becomes a representation of the original scene.

The first part of the image capture process herein will be referred to as “front-of-lens”, while everything that happens after the scene is projected from the back of the lens as “rear-of-lens.”

Flaring can be an unwanted artifact. As such, there are a great many tools designed to minimize or suppress front-of lens flare, such as anti-reflective lens coatings, matte boxes and hard mattes, and flocked or baffled internal mounts to combat rear-of-lens flaring. But flaring can also be a desired creative tool and many lenses have had their coatings removed or been coveted for their particular vulnerability to flaring and dispersion or scattering of light rays. An entire language has developed to describe different types of flaring: veiling, specular, ghosting, starburst, streaks, etc.

It can be desirable to suppress or control flaring as it can have unpredictable and therefore undesirable effects on contrast or exposure. Thus, various tools have been developed to suppress or control flaring.

For example, some tools have emerged that seek to have a measurable effect on overall flaring and its impact on contrast. Additionally, a wide-variety of filters have been introduced by manufacturers that can also manipulate the color cast, contrast, sharpness, and even flaring characteristics. While most of these have been front-of-lens modifiers, some have been developed that can mount in the rear-of-lens cavity. These rear of the lens modifiers have been inherently limited by the structural design of the lens and/or the flange depth of the mount.

Because flaring is specific to the angle that rays of light enter the lens, light ray duration, and light ray intensity, it can be notoriously difficult to recreate certain results. Repeatable, quantifiable flares or flashing have been challenging. As such there exists, a need for a device capable of creating flaring effects or flashing effects in the rear of lens environment.

SUMMARY

In some aspects, the techniques described herein relate to a system for tunable flaring, including a lens mount configured to be attached to a camera device. The lens mount may include a lens including a front surface and a rear surface, the rear surface facing an image plane of the camera device and at least one perforation located on a first surface of the lens mount. In some embodiments of a system, the system further includes a collar configured to be secured to the first surface of the lens mount and at least one light emitting diode disposed on an inner surface of the collar, the at least one light emitting diode configured to emit light in a space between the rear surface of the lens and an image plane of the camera device.

In some embodiments, the collar is rotatable along the first surface of the lens mount between a first position and a second position.

In some embodiments, the at least one light emitting diode is aligned with the at least one perforation when the collar is in the first position and the at least one light emitting diode is out of alignment with the at least one perforation when the captive collar is in the second position.

In some embodiments, when the collar is in the second position the space between the rear surface of the lens mount and the image plane of the camera device is light-tight.

In some embodiments, the lens mount is a PL mount, an LPL mount, an XPL mount, a PRIMO 70 mount, or BNCR mount, G-mount, or a PV mount.

In some embodiments, the at least one light emitting diode is LED tape.

In some embodiments, the at least one light emitting diode is configured to emit light in the non-visible spectrum.

In some embodiments, a system further includes a secondary unit, the secondary unit including a power converter configured to provide electrical power to the at least one emitting diode and a controller configured to control the flow of power between the power converter and the at least one light emitting diode.

In some embodiments, the power converter is configured to receive electrical power from the camera device and provide electrical power to the at least one light emitting diode.

In some embodiments, the controller is in electrical communication with the at least one light emitting diode, the controller additionally configured to adjust the brightness, color or interval of the at least one light emitting diode.

In some embodiments, the controller is in communication with the captive collar, the controller configured to automatically control the rotation of the collar along the first surface of the lens.

In some embodiments, the controller is configured to receive a signal indicating a desired level of flare effect and wherein the controller, in response to the signal received, is configured to rotate the collar until the desired level of flare effect is achieved in the space between the rear surface of the lens mount and the image plane of the camera device.

In some embodiments, the at least one light emitting diode is configured to create a flare effect, a flash effect, or a washed effect in the space between the rear surface of the lens mount and the image plane of the camera device.

In some embodiments, the lens mount includes a plurality of perforations located on a first surface of the lens mount, the plurality of perforations located at regular intervals along the first surface of the lens mount.

In a second aspect, the techniques described herein relate to a camera device with tunable flaring capabilities, the camera device including a lens including a front surface and a rear surface, the rear surface facing an image plane of the camera device and at least one light emitting diode disposed with the camera device between the rear surface of the lens and an image plane of the camera device. In some embodiments of a system, the camera device further includes a controller in electrical communication with the at least one emitting diode, the controller configured to control the emission of light by the at least one light emitting diode.

In some embodiments, the at least one emitting diode is configured to create a flare effect, a flash effect, or a washed effect in the space between the rear surface of the lens mount and the image plane of the camera device.

In some embodiments, the controller is configured to adjust the brightness, color, or interval of the at least one light emitting diode.

In another aspect, the techniques described herein relate to a camera device with tunable flaring capabilities, the camera device including a lens and at least one light emitting diode integrated into the lens, the at least one light emitting diode configured to emit light into a space between a rear surface of the lens. In some embodiments of a camera device, the camera device further includes an image plane of the camera device and a controller configured to control the at least one light emitting diode.

In some embodiments, the at least one emitting diode is configured to create a flare effect, a flash effect, or a washed effect in the space between the rear surface of the lens mount and the image plane of the camera device.

In some embodiments, the controller is configured to adjust the brightness, color or interval of the at least one light emitting diode.

BRIEF DESCRIPTION OF THE DRAWINGS

The detailed description is set forth with reference to the accompanying figures. The use of the same numbers in different figures indicates similar or identical items.

For this discussion, the devices and systems illustrated in the figures are shown as having a multiplicity of components. Various implementations of devices and/or systems, as described herein, may include fewer components, and remain within the scope of the disclosure. Alternatively, other implementations of devices and/or systems may include additional components, or various combinations of the described components, and remain within the scope of the disclosure.

DETAILED DESCRIPTION

Figure 1:
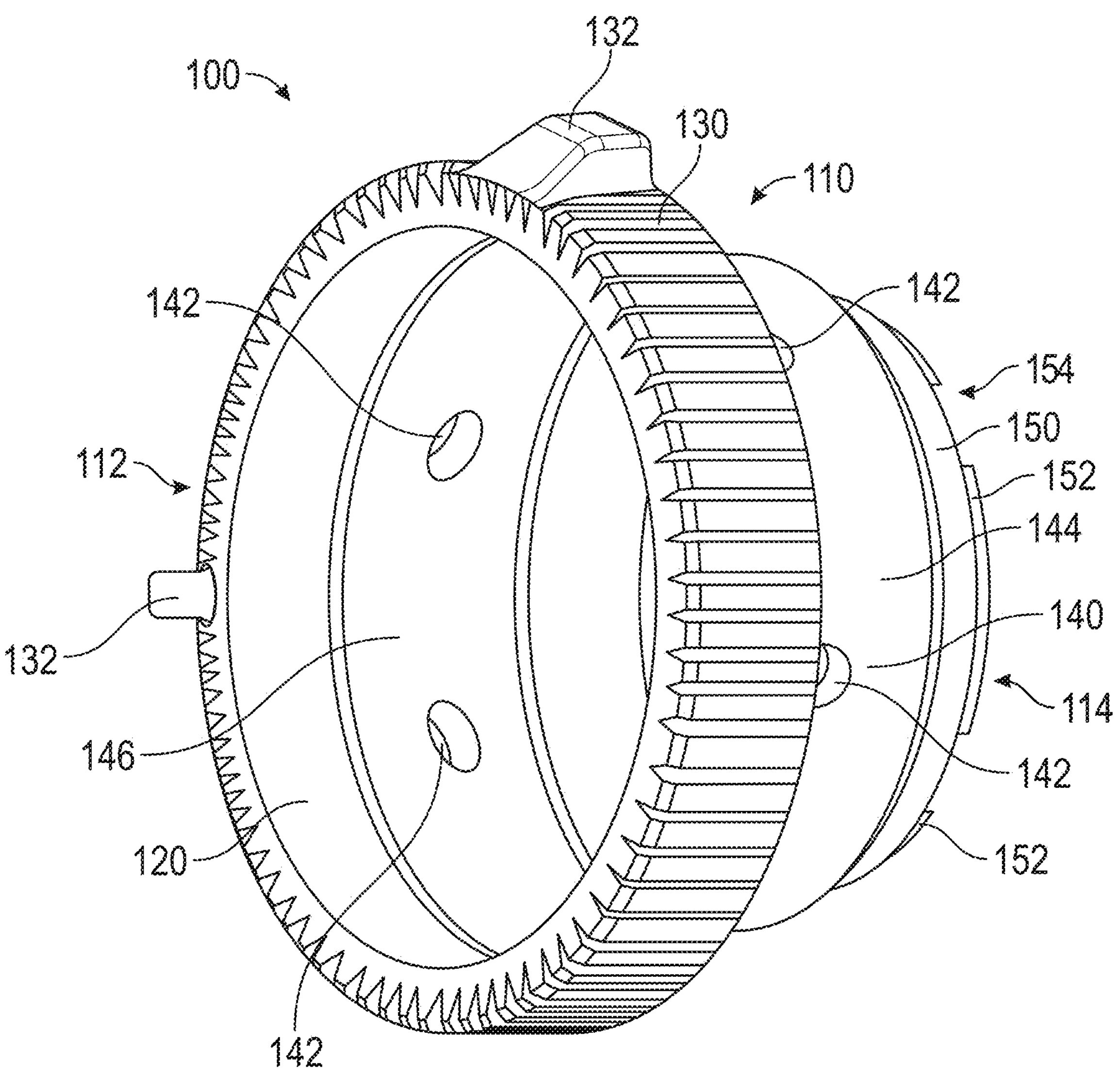
FIG. 1 shows a front prospective view of a lens mount of a variable flare system.

In the following detailed description, reference is made to the accompanying drawings, which form a part hereof. In the drawings, similar symbols typically identify similar components, unless context dictates otherwise. Thus, in some embodiments, part numbers may be used for similar components in multiple figures, or part numbers may vary from figure to figure. The illustrative embodiments described herein are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

The following detailed description is directed to certain specific embodiments of the development. Reference in this specification to "one embodiment," "an embodiment," or "in some embodiments" means that a particular feature, structure, or characteristic described in connection with the embodiment is included in at least one embodiment of the disclosure. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others. Similarly, various requirements are described which may be requirements for some embodiments but may not be requirements for other embodiments. Furthermore, embodiments of the development may include several novel features, no single one of which is solely responsible for its desirable attributes or which is essential to practicing any particular embodiment described herein.

FIG. 1 shows a front prospective view of a lens mount 110 of a variable flare system 100. In some embodiments, the lens mount 110 may be a standard lens mount including, but not limited to, a positive lock (PL) mount, a large positive lock (LPL) mount, a panavision (PV) mount, an XPL mount, a PRIMO 70 mount, a BNCR mount, or a G-mount. The lens mount 110 includes a lens 120, a locking mechanism 130, a collar segment 140, and a connection segment 150.

The lens 120 is disposed within the lens mount 110 near a first end 112 of the lens mount 110. The lens 120 may be any type of lens including, but not limited to a prime lens, a zoom lens, wide-angle lens, a telephoto lens, a macro lens, a standard lens, a fisheye lens, or a tilt-shift lens, or other type of camera lens. In some embodiments, the lens 120 is removable from the lens mount 110, thereby allowing a user to choose a lens that suits their needs. The lens 120 is configured to direct and/or focus an image onto an image plane of a camera device that the lens mount 110 is connected to.

The locking mechanism 130 is located on the first end 112 of the lens mount 110. The locking mechanism 130 is configured to secure the lens 120 within the lens mount 110. In some embodiments, the locking mechanism 130 can be any type of standard locking mechanism including, but not limited to, a twist lock, a button release mechanism, a latch lock, a locking pin, a slide lock, a locking screw, a safety lock, or a rotating lock. In some embodiments, the locking mechanism 130 includes a knurled grip allowing for easy gripping of the locking mechanism 130. In some embodiments, the locking mechanism may include one or more protrusions 132. In some embodiments, the protrusion 132 may have a sloped surface. The one or more protrusions may beneficially allow a user to easily apply a rotational force to the locking mechanism 130.

The collar segment 140 is located adjacent to the locking mechanism 130 of the lens mount 110. The collar segment 140 may be cylindrical in shape and have a diameter smaller than that of the locking mechanism 130. As seen in FIG. 1, the collar segment 140 includes at least one perforation 142. In some embodiments, the perforation 142 may be a hole or porthole such that the perforation 142 penetrates an outer surface 144 of the collar segment 140 and emerges on an inner surface 146 of the collar segment 140. In some embodiments, the collar segment 140 includes a plurality of perforations 142. In some embodiments, the perforations 142 are spaced evenly along the outer surface 144 of the collar segment 140, such that the distance between adjacent perforations 142 is substantially equal. In some embodiments, the perforations 142 are not spaced evenly along the outer surface 144 of the collar segment 140. In some embodiments, the angle of the perforations 142 may be such that the perforation 142 is substantially normal to the outer surface 144 of the collar segment 140. In some embodiments, the perforations 142 may be angled towards the lens 120 allowing a light exterior to the lens mount 110 to pass through the perforations 142 and more directly contact the lens 120. In some embodiments, the perforations 142 may be angled away from the lens 120 allowing a light exterior to the lens mount 110 to pass through the perforations 142 and be directed to an image plane of a camera device when the lens mount 110 is secured to a camera device. In some embodiments, at least one of the perforations 142 may be angled differently from another perforation 142. In some embodiments, each perforation 142 may be angled differently, such that no two perforations 142 are angled the same.

In some embodiments, the collar segment 140 further includes a channel. In some embodiments, the channel extends along the entire circumference of the outer surface 144 of the collar segment 140. In some embodiments, the channel only extends a along a portion of the circumference of the outer surface 144. The channel is configured to receive a screw or other mechanical connector of a collar (such as the collar 160 described below) and secure the collar to the lens mount 110. The channel beneficially allows the collar to be secured to the lens mount 110 while still allowing the collar to be rotated relative to the lens mount 110 without decoupling the collar from the lens mount.

The connection segment 150 is located at a second end 114 of the lens mount 110. In some embodiments, the connection segment 150 is located adjacent to the collar segment 140. In some embodiments, the connection segment 150 is largely cylindrical in shape. In some embodiments, the connection segment 150 has a diameter that is less than that of the collar segment 140. The connection segment 150 is configured to be inserted into a camera device and to engage with the camera device, thereby securing the lens mount 110 to the camera device. As seen in FIG. 1, the connection segment 150 may include a plurality of protrusions 152. In some embodiments, the connection segment 150 may include only one protrusion 152. The protrusions 152 may be disposed on the connection segment 150 at the second end 114 of the lens mount 110. In some embodiments, the protrusions 152 are flanges. In some embodiments where there are a plurality of protrusions 152, the protusions 152 may be spaced along the connection segment such that there is a gap 154 located in between each protrusion 152 and an adjacent protrusion 152. The protrusions 152 are configured to engage with a corresponding part of a camera device when the connection segment 150 is inserted into the camera device, thereby securing the lens mount 110 to the camera device.

Figure 2:
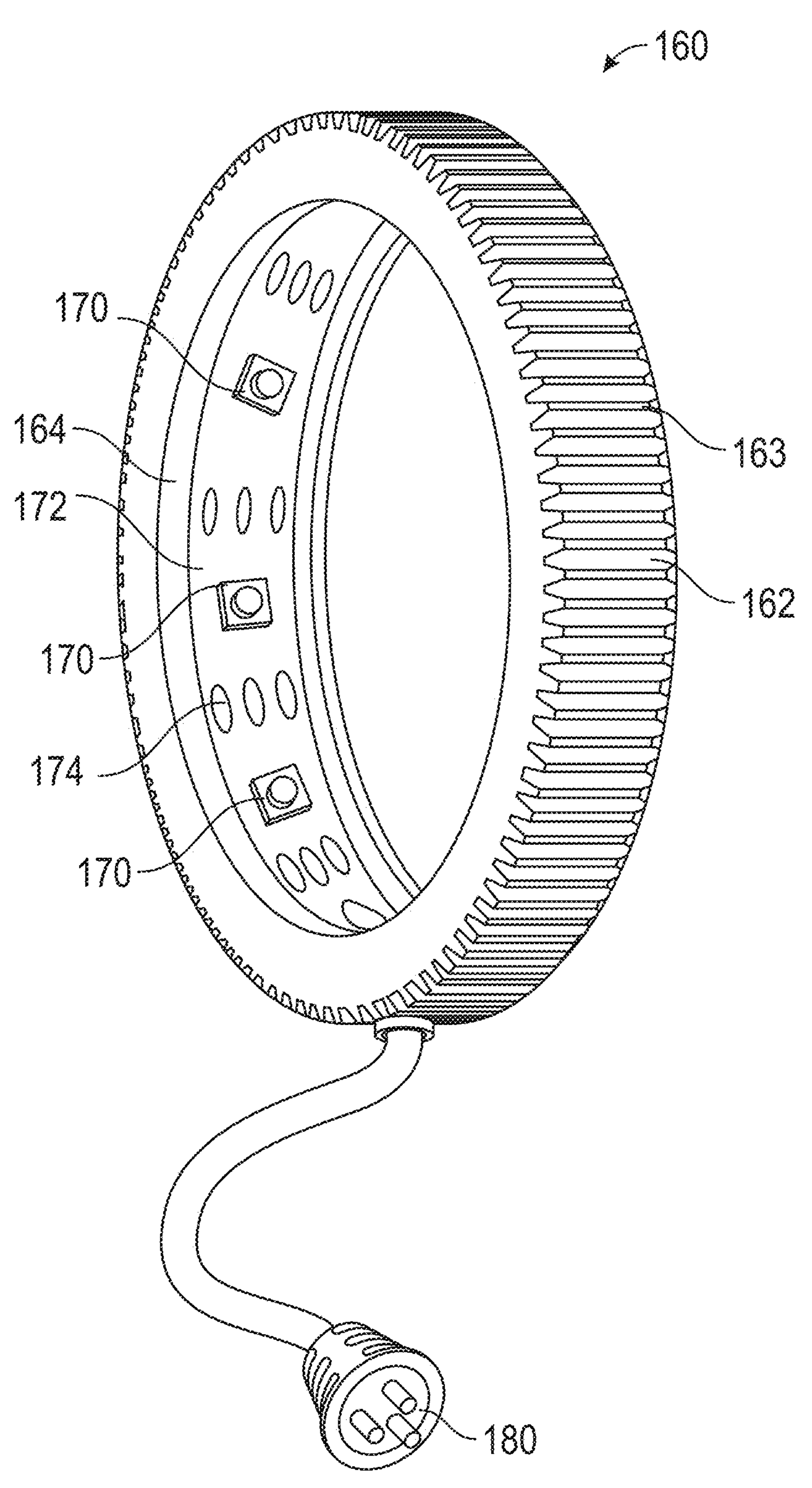
FIG. 2 shows a front isometric view of a collar of a variable flare system.

FIG. 2 shows a front isometric view of a collar 160. The collar 160 is configured to be disposed over the lens mount 110 by sliding over the second end 114 of the lens mount and being secured over the collar segment 140 of the lens mount 110.

In some embodiments, the collar 160 has a general ring-like shape. In some embodiments, the diameter of an outer surface 162 of the collar 160 is greater than the diameter of the locking mechanism 130 of the lens mount 110. This configuration may beneficially allow the collar 160 to be rotated or actuated without rotating or actuating the locking mechanism 130 when the collar 160 is engaged with the lens mount 110. In some embodiments, the outer surface 162 of the collar 160 is knurled or roughened to allow an easier grip of the outer surface 162 for easier rotation or actuation of the collar 160. In some embodiments, the outer surface 162 of the collar 160 is geared such that the collar is able to engage with a motor, a drive system or a follow focus system. In some embodiments, the collar 160 is a gear, such as a 32 pitch gear. In some embodiments, the outer surface of the collar 160 includes a plurality of protrusions 163. The plurality of protrusions 163 may be located on the outer surface 162 of the collar 160 such that the space between each protrusions 163 is equal. In some embodiments, the plurality of protrusions 163 may be located on the outer surface 162 of the collar 160 such that the space between each protrusions 163 is not equal. In some embodiments, the plurality of protrusions 163 serve to allow the collar to engage with a gear or other similar item.

In some embodiments, the inner surface 164 of the collar 160 has a diameter that is substantially similar or slightly larger than the diameter of the outer surface 144 of the collar segment 140 of the lens mount 110. This beneficially allows the collar 160 to be disposed on and secured to the collar segment 140 of the lens mount 110.

As seen in FIG. 2, the collar 160 includes at least one light source 170. In some embodiments, the light source 170 may be, but is not limited to, a light emitting diode (LED), an organic light emitting diode (OLED), an MID light source, a laser diode, a quantum dot, a remote phosphor LED, or other type of illumination source. In some embodiments, the light sources 170 are disposed on and/or include an LED tape 172, including, but not limited to, a single color LED tape, a RGB LED tape, a RGBW LED tape, a tunable white LED tape, a COB (chip on board) LED tape, an addressable LED tape, or a UV LED tape. In some embodiments, the light sources 170 are disposed along the LED tape 172 such that the light sources 170 are spaced equally along the length of the LED tape 172. In some embodiments, the LED tape 172 may include a plurality of connection points 174. In some embodiments, the connection points 174 are holes configured to allow the LED tape 172 to be secured to the inner surface 164 of the collar 160 or within a channel of the inner surface 164. In some embodiments, the plurality of connections points 174 may serve to connect a segment of LED tape to another segment of LED tape. In some embodiments, the connection points 174 may be disposed along the length of the LED tape 172. In some embodiments, groups of connection points 174 may spaced along the length of the LED tape such that the groups of connection points 174 are spaced equally along the length of the LED tape.

The light source 170 is disposed on the inner surface 164 of the collar 160. In some embodiments, the light source 170 is embedded or disposed within a recessed channel on the inner surface 164. In some embodiments, the recessed channel is of sufficient depth such that the light source 170 does not contact the collar segment 140 of the lens mount 110 when the collar 160 is disposed on and/or engaged with the lens mount 110. In some embodiments, the depth of the recessed channel is between about 0.25 cm and about 2 cm, between about 0.5 cm and about 1.5 cm, or between about 0.75 cm and about 1 cm.

The collar 160 is configured to slide over the lens mount 110 onto the collar segment 140 of the lens mount 110 and engage with the lens mount 110 such that the collar 160 is rotatably secured to the lens mount 110. In some embodiments, the collar 160 is secured to the lens mount 110 by means of a mechanical connector. In some embodiments, mechanical connectors may include, but are not limited to, bolts and nuts, dowels, screws, clips, clamps, fasteners, pins, or keys. In some embodiments, the mechanical connector may be inserted or threaded through a corresponding hole or orifice of the collar 160 until the mechanical connector engages with the channel of the lens mount 110, thereby securing the collar 160 to the lens mount 110 and allowing the collar to rotate relative to the lens mount 110.

In some embodiments, the collar 160 includes an electrical connector 180 configured to receive power and/or data from the camera device and/or from a controller or processor. In some embodiments, the electrical connector 180 is a wire cable which connects to a corresponding part of the camera device or of a control box 400 as described below. In some embodiments, the electrical connector 180 is in electrical communication with the light source 170 of the collar 160.

Figure 3A:
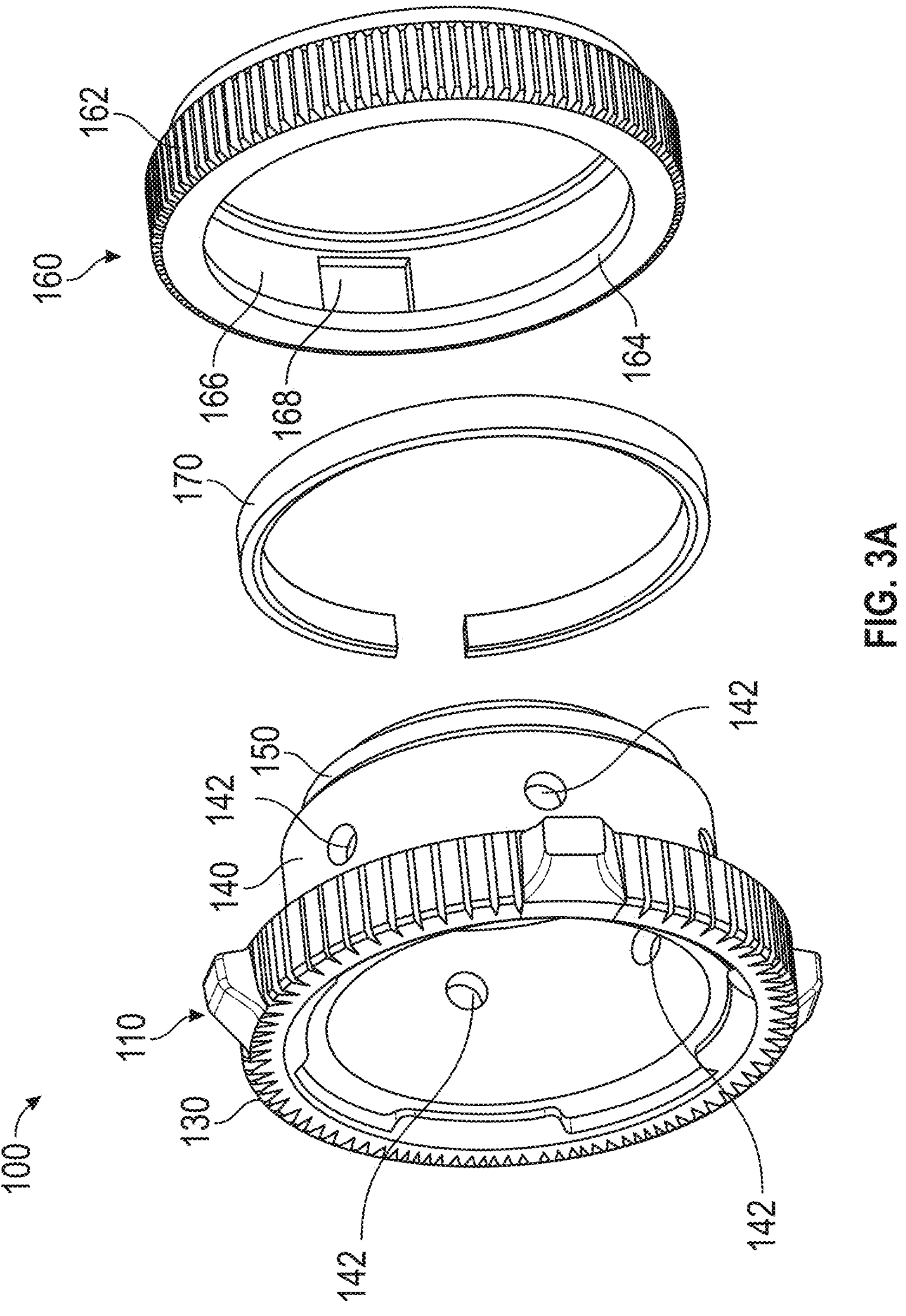
FIG. 3A shows an isometric exploded view of a variable flare system.

FIG. 3A shows an isometric exploded view of a variable flare system 100. As seen in FIG. 3A, the variable flare system may include a lens mount 110, a collar 160, and at least one light source 170.

As seen in FIG. 3A, the collar 160 includes a channel 166 recessed within an inner surface 164 of the captive collar 160. In some embodiments, the light source 170 is configured to be embedded or disposed within the channel 166 on the inner surface 164. In some embodiments, the channel 166 is of sufficient depth such that the light source 170 does not contact the collar segment 140 of lens mount 110 when the collar 160 is engaged with the lens mount 110. In some embodiments, the depth of the channel 166 is between about 0.25 cm and about 2 cm, between about 0.5 cm and about 1.5 cm, or between about 0.75 cm and about 1 cm.

In some embodiments, the collar 160 further includes an insertion gap 168. The insertion gap 168 may be a hole extending from the inner surface 164 of the collar 160 through the outer surface 162 of the captive collar 160. In some embodiments, the insertion gap 168 beneficially allows the light source 170 to be inserted or threaded through the insertion gap 168 and into the channel 166 of the collar 160.

As seen in FIG. 3A, the light source 170 may be a LED strip. In some embodiments, the light source 170 is configured to be inserted through the insertion gap 168 and then disposed within the channel 166 of the collar 160.

Figure 3B:
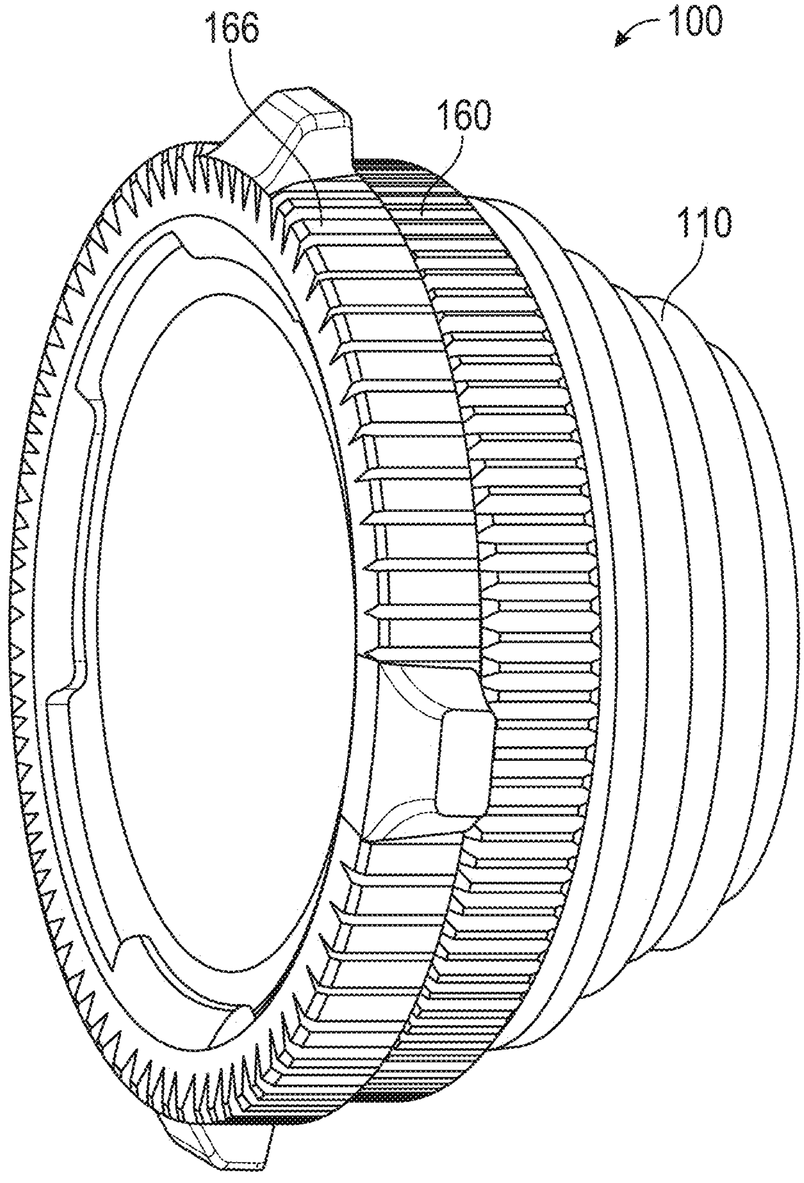
FIG. 3B shows an isometric view of a variable flare system.

FIG. 3B shows an isometric view of a variable flare system 100. As seen in FIG. 3B, once the light source 170 has been disposed within the channel 166, the collar 160 is configured to slide over or to be disposed over the collar segment 140 of the lens mount 110. Once the collar 160 is disposed over the collar segment 140 of the lens mount 110, the lens mount 110 may be secured to the lens mount 110 such that the collar 160 is rotatably connected to the lens mount 110. In some embodiments, the collar 160 is rotatably secured to the lens mount 110 by means of a mechanical connector. In some embodiments, the mechanical connector engages with a channel of the lens mount 110, thereby allowing the collar 160 to rotate relative to the lens mount 110 along the length of the channel.

In some embodiments, the collar 160 is rotatably secured to the lens mount 110 such that the collar 160 may rotate between a first and a second position. In some embodiments, when the collar 160 is in the first position, the light source 170 is aligned with at least one of the perforations 142 of the lens mount 110 such that the interior of the lens mount 110 is exposed to the light emitted by the light source 170. In some embodiments, when the collar 160 is in the first position, light emitted by the light source 170 is directed through the perforations 142 of the lens mount 110, such that a flaring effect, a washing effect, a flashing effect or augmentation effect is created within the camera device that the lens mount 110 is connected to. This configuration may beneficially allow the camera device to produce an image that is flared, flashed, washed or otherwise augmented.

In some embodiments, when the collar 160 is in the second position, the light source 170 is not aligned with the perforations 142 of the lens mount 110. In some embodiments, when the collar 160 is in the second position, the interior of the lens mount 110 is light-tight such that substantially no external light enters the interior of the lens mount 110 via the perforations 142.

In some embodiments, the collar 160 is configured to be rotated to a third position. In some embodiments, when the collar 160 is in the third position, only a portion of the light source 170 is aligned with the perforations 142 of the lens mount 110 such that a portion of the light emitted by the light source 170 is emitted into the perforations 142 and a portion of the light emitted by the light source 170 is blocked by the collar segment 140 of the lens mount 110.

In some embodiments, the collar 160 is configured to be rotated to a fourth position. In some embodiments, when the collar 160 is in the fourth position, the light source 170 is aligned with at least one perforations 142 of the lens mount 110. In some embodiments, when the collar 160 is in the fourth position, the light source 170 is aligned with at least one perforation 142 that is angled differently from the perforation or perforations that the light source 170 is aligned with when the collar 160 is in the first position. This may beneficially create a difference flaring, washing, flashing or augmentation effect in a image captured by a camera device.

In some embodiments, the collar 160 is configured to be rotated manually by applying a rotational force to the collar 160 and rotating the collar 160 to a desired position. In some embodiments, the collar 160 is configured to be rotated automatically by means of a mechanical actuator. In some embodiments, the mechanical actuator includes a motor or drive system of the collar 160. In some embodiments, the mechanical actuator includes a motor or drive system of the lens mount 110. In some embodiments, the mechanical actuator includes an external actuator, such as a motor, a drive system, or a follow focus system. In some embodiments, in response to a signal received from a processor or controller, the mechanical actuator is configured to rotate the collar 160 to a first, second, or third position.

Figure 4:
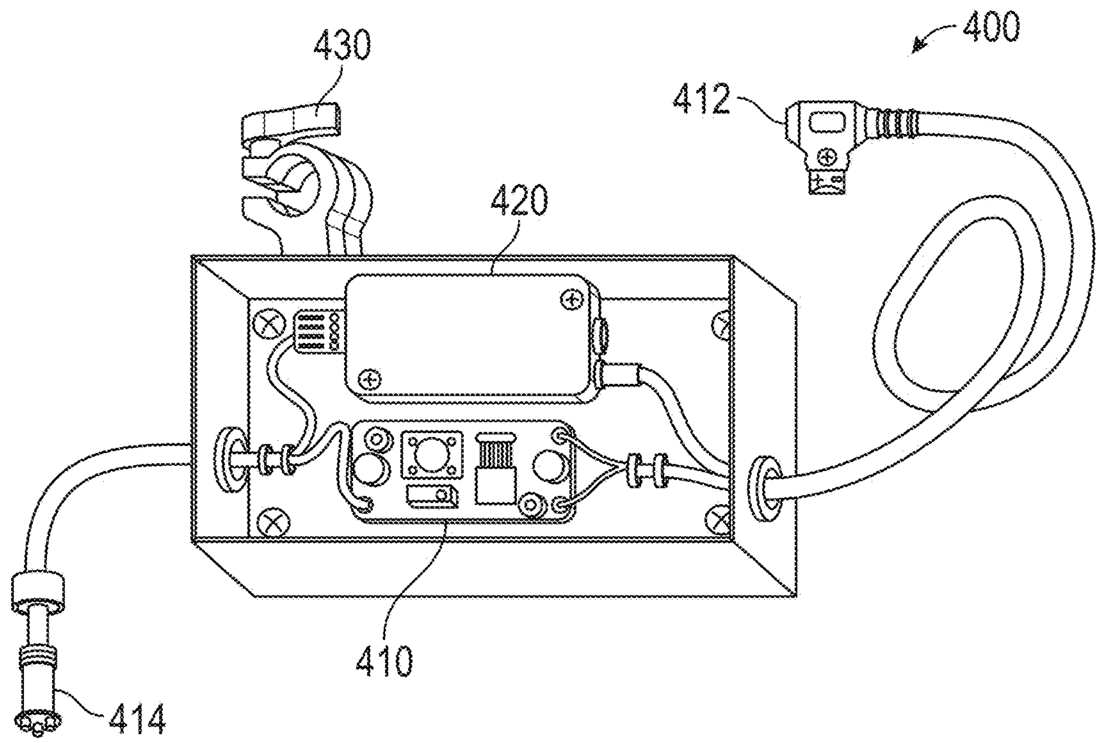
FIG. 4 shows a front view of a control box of a variable flare system with a surface removed in order to see the internal components of the control box.

FIG. 4 shows a front view of a control box 400 with a surface removed in order to see the internal components of the control box 400. In some embodiments, the control box 400 is configured to be mounted onto a camera device. In some embodiments, the components of the control box 400 may be present within the camera device. In some embodiments, the control box 400 includes a power converter 410, at least one controller 420, and a mounting mechanism 430.

The power convertor 410 is in electrical communication with a power source of the camera device. In some embodiments, the power convertor 410 is in electrical communication with the power source of the camera device by means of a first electrical connector 412. In some embodiments, the power convertor 410 is further in electrical communication with the collar 160, including the light source 170 of the collar 160. In some embodiments, the power convertor 410 is in electrical communication with the collar 160 by means of a second electrical connector 414. In some embodiments, the second electrical connector 414 is configured to connect to an electrical connector 180 of the collar 160.

In some embodiments, the power convertor 410 is configured to receive electrical power from the power source of the camera device and to transmit the electrical power to the collar 160 and/or light source 170. In some embodiments, the power convertor 410 is configured to receive electrical power from the power source of the camera device with a voltage between about 5V and about 25V, between about 10 V and about 20 V, or between about 12V and about 15V. In some embodiments, the power convertor is configured to receive the electrical power from the power source and convert the electrical power to a different voltage. In some embodiments, the power converter 410 is configured to convert the electrical power received from the power source of the camera device to a voltage between about 0V and 10 V, between about 2V and 8V, or to about 5V. After the power converter 410 has converted the electrical power received from the power source of a camera device, the power convertor 410 may be configured to transmit the converted electrical power to the collar 160 and/or the light source 170.

As seen in FIG. 4, the control box 400 may also include at least one controller or processor 420. The controller 420 may be in electrical communication with various features of the camera device, the control box 400, and the collar 160. In some embodiments, the controller 420 is in electrical communication with the camera device by means of the first electrical connector 412. In some embodiments, the controller 420 is in electrical communication with the collar 160 and/or the light source 170 by means of the second electrical connector 414. In some embodiments, the controller 420 is located within the camera device, within the lens mount 110, or within the collar 160 itself. The controller 420 is configured to control various aspects of the variable flare system 100 and/or the camera device. These aspects of control are described in further detail below.

In some embodiments, the control box 400 further includes a mounting mechanism 430. The mounting mechanism 430 is configured to mount and secure the control box 400 to a camera device. In some embodiments, the mounting mechanism 430 may be any type of industry standard mounts, including, but not limited to, a hot shoe mount, a rod mount, or a handlebar mount. The mounting mechanism 430 beneficially allows the control box 400 to be mounted to a camera device, camera mount, or other structure.

Figure 5:
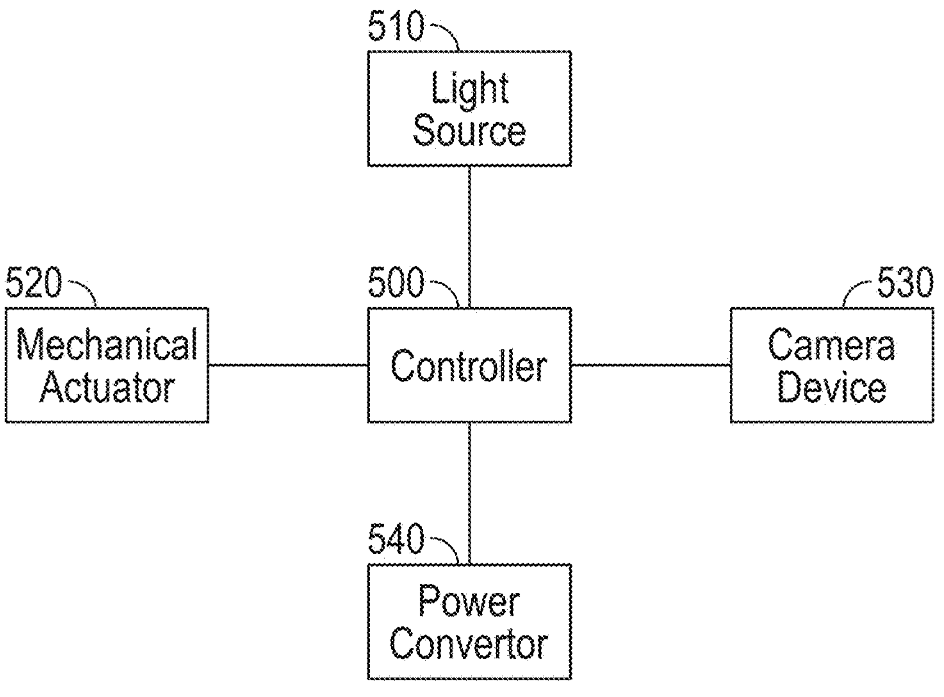
FIG. 5 is a block diagram schematically illustrating various components of a variable flare system.

FIG. 5 is a block diagram schematically illustrating various components of a camera system as described herein. The camera system may include a controller 500 which can be used in autonomously controlling the operation of the camera system. In some embodiments, the controller 500 is the controller or processor 420 as described above. The controller 500 may include one or more processors, integrated circuits, field-programmable gate array or any other suitable control circuitry. In some embodiments, the controller 500 includes a Raspberry Pi system. In some embodiments, the controller 500 includes a DMX controller.

As seen in FIG. 5, the controller 500 is in communication with a light source 510. In some embodiments, the light source 510 is the light source 170 as described above. The communication between the controller 500 and the light source 510 may be wired or wireless. In some embodiments, the controller 500 may send a signal to the light source 510 to adjust the brightness, color, duration, and power state of the light source 510. A change in the state of the light source 510 may be commanded in response to a user command inputted via a camera device 530 or user device. The controller 500 can also command a change in the state of the light source 510 in response to a signal received from the camera device 530.

In some embodiments, in response to a signal received from the controller 500, the light source 510 may become brighter or dimmer. In some embodiments, in response to a signal received from the controller 500, the light source 510 may change the color of the light emitted by the light source 510. In some embodiments, in response to a signal received from the controller 500, the power state of the light source 510 may be changed, for example from an off state to an on state or from an on state to an off state. In some embodiments, in response to a signal received from the controller 500, the duration of the power state of the light source 510 may be adjusted, for example, after receiving a signal for the controller 500, the light source 510 may turn on for a duration of five seconds and then return to an off state. In some embodiments, in response to a signal received from the controller 500, an interval of the light source 510 may be adjusted such that the light source repeatedly changes to a certain power state after the duration of a certain period of time, for example, in response to a signal received from the controller 500, the light source 510 may be configured to toggle between an off state and an on state every five seconds.

As seen in FIG. 5, the controller 500 is also in communication with a mechanical actuator 520. In some embodiments, the mechanical actuator 520 may be a motor or drive system of the collar 160. In some embodiments, the mechanical actuator 520 includes a motor or drive system of the lens mount 110. In some embodiments, the mechanical actuator 520 includes an external actuator, such as a motor, a drive system, or a follow focus system.

The communication between the controller 500 and the mechanical actuator 520 may be wired or wireless. In some embodiments, the controller 500 may send a signal to the mechanical actuator 520 to rotate the collar 160 between a first, second, third or fourth position as described above. A change in the rotational position of the collar 160 may be commanded in response to a user command inputted via the camera device 530 or user device. The controller 500 can also command a change in the rotational position of the collar 160 in response to a signal received from the camera device 530.

In some embodiments, in response to a signal received from the controller 500, the mechanical actuator 520 is configured to rotate the collar 160 to a first position, a second position, a third position, or a fourth position as described above.

As seen in FIG. 5, the controller 500 is also in communication with a camera device 530. The communication between the controller 500 and the camera device 530 may be wired or wireless. In some embodiments, the controller 500 is configured to send or receive signals from the camera device 530. In some embodiments, the controller 500, in response to a signal received from the camera device 530, is configured to send a signal to the light source 510 and/or the mechanical actuator 520 commanding a change in the state of the light source 510 or the mechanical actuator 520. In some embodiments, the camera device 530 is configured to send a signal to the controller 500 in response to a user command inputted via the camera device 530 or user device.

As seen in FIG. 5, the controller is also in communication with a power converter 540. In some embodiments, the power converter 540 is the power convertor 410 described above. The communication between the controller 500 and the power converter 540 may be wired or wireless. In some embodiments, the controller 500 may send a signal to the power convertor 540 to receive power from a power source of the camera device 530, to convert power of received from the camera device 530 to a different voltage, and/or to transmit the converted power to the collar 160 and/or light source 170. Signals sent from the controller 500 to the power convertor 540 may be commanded in response to a user command inputted via the camera device 530 or user device. The controller 500 can also send signals to the power convertor 540 in response to a signal received from the camera device 230.

In some embodiments, the controller 500 may receive a signal from a user device, the camera device 530, the collar 160, and/or the light source 510. In response to the signal received, the controller 500 is configured to send a signal to the power converter 500 commanding the power convertor 500 to receive, convert and transmit power from the camera device 530 to the light source 510 and/or collar 160.

Figure 6:
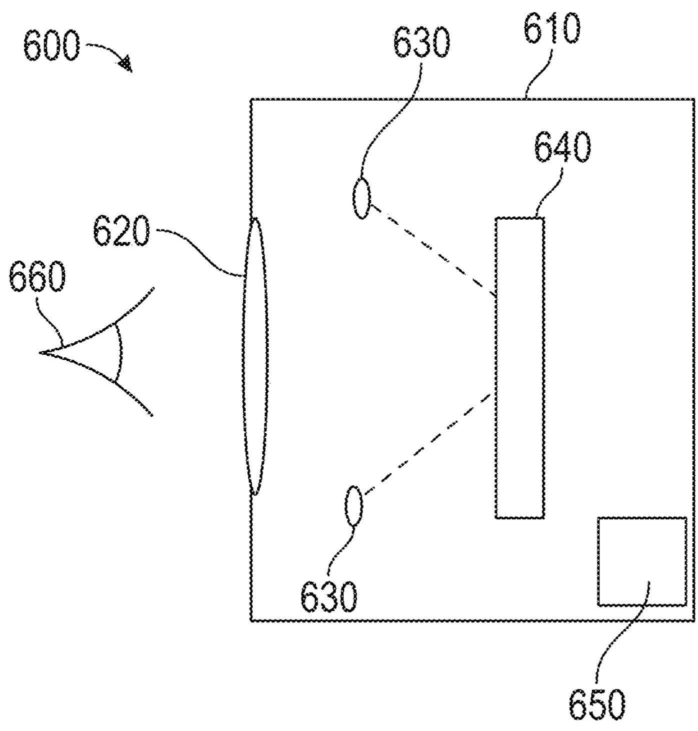
FIG. 6 shows a schematic view of a variable flare system.

FIG. 6 shows a schematic view of a variable flare system 600. The variable flare system 600 may be similar or identical in many respects to the variable flare system 100 as described above.

As seen in the FIG. 6, the system 600 includes a camera device 610. The camera device includes a lens 620, at least one light source 630, an image plane 640 and a controller or processor 650. The camera device 610 is configured to capture an image of an object or observer 660.

The lens 620 may be similar or identical in many respects to the lens 120 described above. In some embodiments, the lens 620 is attached to the camera device 610 by means of a lens mount.

The light source 630 may be similar or identical to the light source 170 or 510 as described above. As seen in FIG. 6, the light source 630 may be contained within the camera device 610. In some embodiments, the light source 630 may be positioned within the camera device 610 such that light produced by the light source 630 is directed towards the image plane 640. In some embodiments, the light source 630 may be positioned within the camera device 610 such that light produced by the light source 630 is directed towards the lens 620. In some embodiments, the light source 630 may be in electrical communication with the controller or processor 650. In some embodiments, the controller or processor 650 is configured to control the light source 630 as described above. In some embodiments, the controller or processor 650 is configured to control a power state of the light source (e.g., toggle between an on and an off-power state). In some embodiments, the controller or processor 650 is further configured to control the luminosity, brightness, color, duration, and power state of the light source. In some embodiments, the light source 630 may be configured to move and/or rotate in response to a signal received from the controller 650 such that the angle of the light emitted by the light source 630 striking the image plane 640 is changed.

The image plane 640 is located within the camera device 610. The image plane 640 is configured to form an image within the camera device 610. In some embodiments, the image plane 640 may be the surface of film. In some embodiments, the image plane 640 may be a sensor configured to capture an image.

Figure 7:
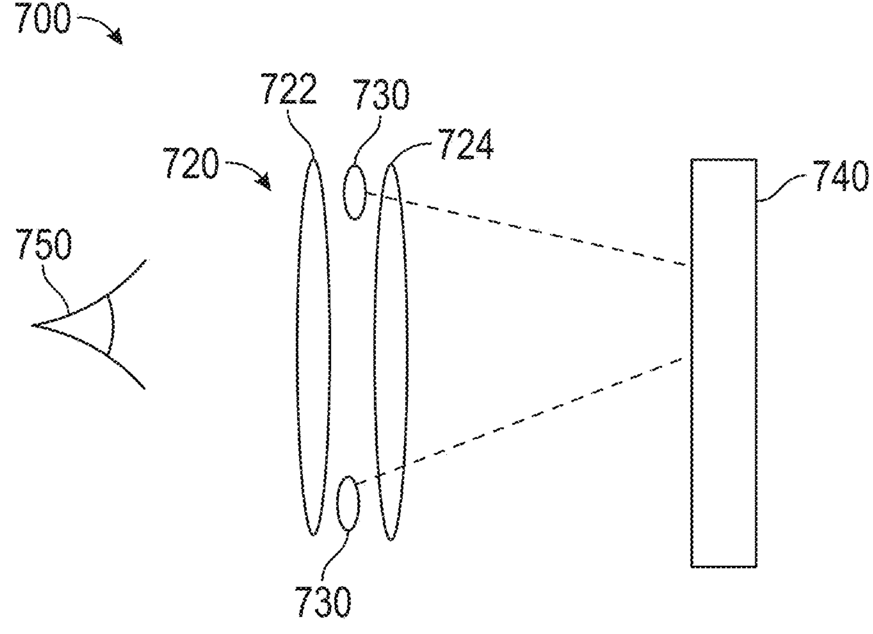
FIG. 7 shows a schematic view of a variable flare system.

FIG. 7 shows a schematic view of a variable flare system 700. The variable flare system 700 may be similar or identical in many respects to the variable flare system 100 or 700 as described above.

As seen in the FIG. 7, the system 700 includes a lens 720, at least one light source 730, and an image plane 740.

The lens 720 may be similar or identical in many respects to the lens 120 or 620 described above. The lens 720 include a front surface 722 and a rear surface 724. In some embodiments, the lens 720 may be substantially hollow between the front surface 722 and the rear surface 724.

The light source 730 may be similar or identical to the light source 170 or 630 as described above. As seen in FIG. 7, the light source 730 may be contained within the lens 720. In some embodiments, the lights source 730 may be positioned within the hollow area of the lens 720 between the front surface 722 and the rear surface 724. In some embodiments, the light source. In some embodiments, the light source 770 may be angled within the lens 720 such that light produced by the light source is directed towards an image plane 740 of a camera device and away from an observer 750. In some embodiments, the light source 730 may be in electrical communication with a controller or processor of a camera device. In some embodiments, the light source 730 is configured to change the luminosity, brightness, color, duration, and power state of the light source in response to a signal received from the controller or processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present disclosure. Various modifications to these implementations will be readily apparent to those skilled in the art, and the generic principles defined herein may be applied to other implementations without departing from the spirit or scope of the disclosure. Thus, the present disclosure is not intended to be limited to the implementations shown herein but is to be accorded the widest scope consistent with the principles and novel features disclosed herein.

What is claimed is:

1. A system for tunable flaring, comprising:

a lens mount configured to be attached to a camera device, the lens mount comprising:

a lens comprising a front surface and a rear surface, the rear surface facing an image plane of the camera device; and at least one perforation located on a first surface of the lens mount;

a collar configured to be secured to the first surface of the lens mount, the collar rotatable along the first surface of the lens mount between a first position and a second position; and at least one light emitting diode disposed on an inner surface of the collar, the at least one light emitting diode configured to emit light in a space between the rear surface of the lens and an image plane of the camera device.

2. The system of claim 1, wherein the at least one light emitting diode is aligned with the at least one perforation when the collar is in the first position and the at least one light emitting diode is out of alignment with the at least one perforation when the collar is in the second position.

3. The system of claim 1, wherein when the collar is in the second position the space between the rear surface of the lens mount and the image plane of the camera device is light-tight.

4. The system of claim 1, wherein the lens mount is a positive-lock mount.

5. The system of claim 1, wherein the at least one light emitting diode is LED tape.

6. The system of claim 1, wherein the at least one light emitting diode is configured to emit light in the non-visible spectrum.

7. The system of claim 1 further comprising a secondary unit, wherein the secondary unit comprises:

a power converter configured to provide electrical power to the at least one emitting diode; and a controller configured to control the flow of power between the power converter and the at least one light emitting diode.

8. The system of claim 7, wherein the power converter is configured to receive electrical power from the camera device and provide electrical power to the at least one light emitting diode.

9. The system of claim 7, wherein the controller is in electrical communication with the at least one light emitting diode, the controller additionally configured to adjust the brightness, color or interval of the at least one light emitting diode.

10. The system of claim 7, wherein the controller is in communication with the collar, the controller configured to automatically control the rotation of the collar along the first surface of the lens.

11. The system of claim 10, wherein the controller is configured to receive a signal indicating a desired level of flare effect and wherein the controller, in response to the signal received, is configured to rotate the collar until the desired level of flare effect is achieved in the space between the rear surface of the lens mount and the image plane of the camera device.

12. The system of claim 1, wherein the at least one light emitting diode is configured to create a flare effect, a flash effect, or a washed effect in the space between the rear surface of the lens mount and the image plane of the camera device.

13. The system of claim 1, wherein the lens mount comprises a plurality of perforations located on the first surface of the lens mount, the plurality of perforations located at regular intervals along the first surface of the lens mount.

14. The system of claim 1, wherein the collar is configured to be rotated to a third position, the at least one light emitting diode being partially aligned with the at least one perforation when the collar is in the third position.

15. The system of claim 1, wherein the at least one perforation is angled such that light passing through the at least one perforation is directed substantially toward the image plane.

16. The system of claim 1, wherein the at least one perforation comprises a plurality of perforations, wherein a first perforation of the plurality of perforations is angled differently from a second perforation of the plurality of perforations.

17. The system of claim 16, wherein the at least one light emitting diode is aligned with the first perforation when the collar is in the first position.

18. The system of claim 17, wherein the at least one light emitting diode is aligned with the second perforation when the collar is in a third position.

19. The system of claim 18, wherein a flare effect, flash effect, or washed effect created by the at least one light emitting diode in the space between the rear surface of the lens mount and the image plane of the camera device when the collar is in the first position is different from a flare effect, flash effect, or washed effect created by the at least one light emitting diode when the collar is in the third position.

* * * * *